Patented Nov. 4, 1952

2,616,892

UNITED STATES PATENT OFFICE 2,616,892

QUATERNARY SALTS OF 2,7-DIAMINO-9-ALPHA-THIENYL-PHENANTHRIDINE

Leslie P. Walls and Norman Whittaker, London, England, assignors to Burroughs Wellcome & Co. (U. S. A.) Inc., Tuckahoe, N. Y., a corporation of New York No Drawing. Application March 14, 1950, Serial No 149,651. In Great Britain March 17, 1949

3 Claims. (Cl. 260—286)

The present invention relates to new phenanthridine compounds of therapeutic value and their manufacture.

In prior publications the manufacture of 9-phenyl- and 9-substituted phenyl-phenanthridine compounds has been proposed, for example in British patent specifications 372,859, 511,353, 578,226 and 587,673 and in the specifications of co-pending patent applications Nos. 18,519/47, 28,516/48 and 21,894/49. The compounds described in these specifications, particularly in the form of their quaternary salts, were found to have useful therapeutic properties and in particular some of the compounds were useful in having a trypanocidal action. The substances 2:7 - diamino - 9 - phenyl - 10 - methyl phenanthridinium bromide and corresponding chloride have been successfully applied clinically against infections of Trypanosoma congolense.

It has now been found that when a 9-α-thienyl substituent is present instead of a 9-phenyl substituent, the product, 2:7-diamino-9-α-thienyl-10-methylphenanthridinium bromide or other corresponding quaternary salt, not only exceeds the corresponding 9-phenyl compound in its curative action in T. congolense infections in mice but has a reduced toxicity. Since the chief disadvantage of 2,7-diamino-9-phenyl-10-methylphenanthridinium salts has been their toxic action, the much wider margin between curative and toxic dose found in the 9-α-thienyl compound constitutes a major advance in the chemotherapy of T. congolense infections. It is also active against T. rhodesiense and against streptococcal infections in vivo, in which latter respect it differs from its 9-phenyl analogue.

The present invention comprises, therefore, as a therapeutic agent of improved curative action against infections of Trypanosoma congolense and reduced toxicity, a quaternary salt of the compound 2:7 - diamino - 9 - α - thienyl phenanthridine.

The compound may be prepared by routes similar to those already described for the preparation of 9-phenyl substituted phenanthridine compounds. We prefer to condense thiophene 2-carboxyl chloride, the preparation of which we describe below, with either 2-amino-4:4'-biscarbethoxy-aminodiphenyl or 2-amino-4:4'-dinitrodiphenyl, followed by cyclization of the resulting α-thienamidodiphenyl derivatives by methods already known for the formation of phenanthridine derivatives. The 2:7-diamino-9-α-thienylphenanthridine is then obtained from the product of the cyclization reaction by either hydrolysis or reduction respectively, preferably after quaternization.

Details of preparation of the compounds are given in the following example given by way of illustration.

Example 2-acetylthiophene was prepared in good yield according to the method of Hartough and Kosak, Journal of the American Chemical Society, 1947, volume 69, page 1012.

2-acetylthiophene (60 grams) is covered with 10% sodium hypochlorite solution (500 g.) and vigorously stirred on the steam-bath. When the temperature is 40–50° C. a vigorous reaction ensues and chloroform is evolved. Heating is then discontinued. When the reaction subsides more hypochlorite solution is added in portions of 50 g. until the addition of a further quantity produces no vigorous evolution of chloroform. After cooling, excess chlorine is removed by the addition of liquid sulphur dioxide, and the solution acidified with sulphuric acid and then extracted with ether. The ether extract is shaken with sodium hydroxide solution and the lower layer is then separated and a stream of air blown through until all the ether is removed. The solution is acidified with sulphuric acid and, after cooling, the product is filtered and washed with water. The yield of thiophene-2-carboxylic acid is 45–50 g., melting point 124–125° C.

This acid (50 g.) and thionyl chloride (50 ml.) are refluxed for 1 hour and the excess thionyl chloride then distilled off at atmospheric pressure. The product is collected at 205–210° C./760 mm. and redistilled under reduced pressure to give pure thiophene-2-carboxyl chloride (50 g.), a colorless liquid which does not fume noticeably in the air.

A mixture of 2-amino - 4:4' - biscarbethoxy-aminodiphenyl (70.5 g.), nitrobenzene (redistilled, 300 millilitres) and thiophene-2-carboxyl chloride (30 g.) is heated in a bath at 150° C. for 2 hours, and the solution set aside overnight. The almost colorless crystals which separate are filtered, washed with a little nitrobenzene and, after the addition of hot alcohol (300 ml. at 78° C.), digested on the steam-bath until solution occurs. After cooling, the colorless plates of 4:4'-biscarbethoxy-amino-2-α-thienamidodiphenyl are filtered and washed with alcohol. The yield is 79 g., melting point 197–198° C.

4:4' - biscarbethoxyamino - 2 - α - thienamidodiphenyl (79 g.) and phosphoryl chloride (80 ml.) are heated in an oil bath at 130–135° C.

for 75 minutes—after this time evolution of hydrochloric acid appears to be complete. After cooling, the suspension of red needles is poured on to ice and an exces of concentrated ammonia solution, with stirring, and when the initial vigorous reaction subsides the mixture is heated on the steam-bath. The cooled liquid is decanted from the rock-like solid; the latter is dissolved in hot pyridine and precipitated by the addition of water. The oily suspension is cooled to room temperature and stirred during the addition of small quantities of glacial acetic acid until the product becomes solid. The addition of acetic acid is then discontinued, and the solid filtered and washed well with water. Concentrated hydrochloric acid (40 ml.) is added to a solution of the solid in hot glacial acetic acid (400 ml.) and, after cooling, the red needles which have separated are filtered and recrystallized from glacial acetic acid; they take the form of red fine needles, melting at 248° C. with decomposition. This hydrochloride is dissolved in hot alcohol and neutralized with the minimum quantity of concentrated ammonia (until the red color has given place to pale yellow) and a seed of the product introduced. Almost immediately 2:7 - bis - carbethoxyamino - 9 - α - thienyl-phenanthridine separates as pale yellow prisms which are collected after cooling: yield 35 g., melting point 227–229° C. with decomposition.

Dimethyl sulphate (dried over anhydrous potassium carbonate and neutral to Congo red paper, 24 ml.) is added to a solution of 2:7-bis-carbethoxyamino - 9 - α - thienylphenanthridine (16 g.) in redistilled nitrobenzene (80 ml.) at 120° C. The internal temperature is then raised to 135° C. and the solution set aside to cool forthwith, adding a seed of the product. After cooling, the orange hexagonal plates are filtered, washed with benzene and dried; yield 18 g., melting point 241° C., with decomposition. The methosulphate is dissolved in hot water and converted to the chloride by the addition of concentrated hydrochloric acid (10 ml.). The filtered product is crystallized from hot water, after the addition of a few drops of 2 normal hydrochloric acid, as fine orange needles of 2:7-bis-carbethoxyamino - 9 - α - thienyl - 10 - methylphenanthridinium chloride, melting point 239° C. (with decomposition) in a yield of 16 g.

2:7 - bis - carbethoxyamino - 9 - α - thienyl-10-methylphenanthridinium chloride (11.5 g.) is added portionwise to a mixture of concentrated sulphuric acid (12 ml.) and water (12 ml.) at 135–140° C., additions being made when the vigorous effervescence from the previous portions has subsided. The mixture is maintained at the same temperature until effervescence of carbon dioxide has ceased (approximately 40 minutes from the commencement of the reaction), and is then poured into water (200 ml.), whereupon crystallization of an acid sulphate takes place. The suspension is warmed to 80° C. and neutralized by addition of ammonia, with stirring (the addition being made dropwise near the end point), filtered from a small quantity of insoluble by-product and salted out with potassium bromide. On cooling a solution of the dried material in the minimum of hot alcohol, a mixture of black needles and a fine crystalline solid separates and is filtered. The filter residue is treated with sufficient cold water to dissolve the black needles, filtered from the insoluble material and again salted out with potassium bromide.

On crystallizing the filtered and dried product from alcohol, 2:7-diamino-9-α-thienyl-10-methylphenanthridinium bromide is obtained as deep-purple prisms and needles of melting point 256° C. (with decomposition) in a yield of 5.6 g.

Other salts such as the iodide, chloride, phosphate and the like can be prepared from the sulfate or bromide by conventional methods. The character of the anion, while of interest for certain applications or for reasons of economy, does not affect the curative properties and we therefore consider all non-toxic salts as equivalents.

We claim:

1. As a therapeutic agent of improved curative action against infections of *Trypanosoma congolense*, and reduced toxicity, a quarternary salt of the compound 2:7-diamino-9-α-thienyl-phenanthridine.

2. As a therapeutic agent of improved curative action against infections of *Trypanosoma congolense* and of reduced toxicity, a compound

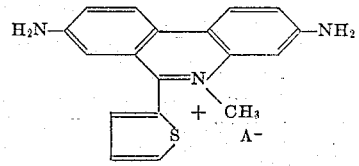

represented by the formula wherein A⁻ is an anion derived from a non-toxic acid.

3. A therapeutic agent as claimed in claim 1, wherein said quarternary salt is 2:7-diamino-9-α-thienyl-10-methylphenanthridinium bromide.

LESLIE P. WALLS.
NORMAN WHITTAKER.

REFERENCES CITED

The following references are of record in the file of this patent:

UNITED STATES PATENTS

| Number | Name | Date |
|---|---|---|
| 2,437,869 | Walls | Mar. 16, 1948 |

OTHER REFERENCES

Williams: "Detoxification Mechanisms," (John Wiley, N. Y., 1947), pp. 194–199.

Hartmann et al.: Helv. Chim. Acta., vol. 2, p. 60 (1919).

Ex parte Bywater, 83 USPQ 4.

Lew et al.: J. Am. Chem. Soc., vol. 71, p. 5715 (Dec. 1950).